United States Patent
Kojima et al.

(10) Patent No.: US 6,917,704 B2
(45) Date of Patent: Jul. 12, 2005

(54) IMAGE PROCESSING METHOD, IMAGE PROCESSING APPARATUS AND IMAGE PROCESSING SYSTEM

(75) Inventors: Akio Kojima, Neyagawa (JP); Tatsumi Watanabe, Kyoto-Fu (JP); Yasuhiro Kuwahara, Moriguchi (JP); Toshiharu Kurosawa, Osaka (JP); Hirotaka Oku, Katano (JP)

(73) Assignee: Matsushita Electric Industrial Co., Ltd., Osaka-Fu (JP)

(*) Notice: Subject to any disclaimer, the term of this patent is extended or adjusted under 35 U.S.C. 154(b) by 624 days.

(21) Appl. No.: 09/863,065

(22) Filed: May 23, 2001

(65) Prior Publication Data

US 2002/0021834 A1 Feb. 21, 2002

(30) Foreign Application Priority Data

May 25, 2000 (JP) ........................................ 2000-154706

(51) Int. Cl.[7] ............................. G06K 9/00; G06K 9/34; G06K 9/36
(52) U.S. Cl. ........................ 382/166; 382/164; 382/173; 382/180; 382/206
(58) Field of Search ............................... 382/162, 164, 382/166, 172, 173, 180, 206, 243, 251, 270–273, 286, 288; 345/589–593; 348/14.13, 568; 358/465, 466, 518–522

(56) References Cited

U.S. PATENT DOCUMENTS

| | | | | |
|---|---|---|---|---|
| 5,487,119 A | * | 1/1996 | Kimura et al. | 382/239 |
| 5,544,284 A | * | 8/1996 | Allebach et al. | 345/603 |
| 5,608,851 A | * | 3/1997 | Kobayashi | 345/591 |
| 5,926,292 A | * | 7/1999 | Ishikawa et al. | 358/534 |
| 6,118,552 A | * | 9/2000 | Suzuki et al. | 382/166 |
| 6,269,186 B1 | * | 7/2001 | Makita | 382/172 |
| 6,285,458 B1 | * | 9/2001 | Yada | 358/1.15 |
| 2001/0028737 | * | 10/2001 | Takakura et al. | 382/162 |

FOREIGN PATENT DOCUMENTS

| | | | | |
|---|---|---|---|---|
| JP | 61-252792 | 11/1986 | ........... | H04N/11/04 |
| JP | 1-264092 | 10/1989 | ........... | H04N/11/02 |

* cited by examiner

Primary Examiner—Bhavesh M. Mehta
Assistant Examiner—Yubin Hung
(74) Attorney, Agent, or Firm—McDermott Will & Emery LLP

(57) ABSTRACT

The invention relates to the image processing, and more particularly to the image processing method, the image processing apparatus, and the image processing system that compress color data. In order to extract the representative color from a small region on the color image in order to approximate to the color image, the invention performs the calculating of an average and a variance of color data of the small region, the color of which the variance is the largest is determined as a target color. According to the average of the target color, the small region is divided into two sections. After calculating the region information of the two sections and each representative color of section, judging whether the obtained number of representative colors is more than the requested number of colors, if the obtained number is more than the required number of colors, the dividing is completed. If not, the dividing is repeated again.

23 Claims, 15 Drawing Sheets

IMAGE PROCESSING METHOD, IMAGE PROCESSING APPARATUS AND IMAGE PROCESSING SYSTEM

BACKGROUND OF THE INVENTION

1. Field of the Invention

The invention relates generally to the image processing, and more particularly to the image processing method, the image processing apparatus and the image processing system for compressing color data.

2. Prior Art of the Invention

The color image has a huge size of data regarding colors. When the color data is displayed or transmitted, it is used to apply the method to the compression of the data size that the number of the original color data is approximated with the smaller number of colors.

A method is well known as the compressing; that is to calculate an approximated data by treating respective RGB signals ("R" means "red", "G" means "green", and "B" means "blue") independently, and which is disclosed in Japanese Laid-open publication No. 61-252792, for example. The processing is explained according to FIG. 15. In FIG. 15, every color data of image information per color (the image information classified by colors included in the image data) are inputted into pre-encoder 91a, 91b and 91c, via input device 90a, 90b and 90c. The pre-encoder 91a, 91b and 91c calculate an average of data per color (the intensity of each RBG signal), and then divide a specified block of color image into two regions according to the average. In addition, the pre-encoder 91a, 91b and 91c average each data of picture elements included in the divided regions, and then calculate two representative values. According to the above processing, the block is divided into two regions per color, and two representative values are calculated per color. The combination of three colors of RGB can divide the block into $2^3$ regions, that is to say, 8 regions, and obtain 8 colors representing each region. A post-encoder 92 detects the appearance frequency of 8 representative colors in the block, and then extracts two colors as a representative color. Those two colors are defined as a representative color in the block. Thus obtained two representative colors are inputted into an output device 93.

Besides, another method is also well known; the approximation data can be calculated by analyzing main components of RGB signals, which is disclosed in Japanese Laid-open Publication No. 01-264092, for instance. In this method, the colors (main components) representing the specific block are determined according to the correlation of the RGB signals, and according to the main components the block is divided. Therefore, the colors of the block can be approximated with specific number of representative colors.

However, the method disclosed in the Japanese Laid-open Publication No. 61-252792 has a problem that it is easy to generate a difference between the restoration image and the original because each of RGB signals is treated independently and the correlation of colors each other is not taken into consideration at all.

On the other hand, the method in the Japanese Laid-open Publication No. 01-264092 has the following problems. Since the analysis of the main components requires the multidimensional matrix calculation in order to calculate the RGB correlation, the processing volume increases. Along with the increase of the processing volume, the hardware scale such as processing circuits also gets big. Additionally, in case of the software processing with CPU and the like, the method needs much calculation time.

Moreover, in any methods described above, it is not possible to obtain the output data until all processing are completed. Accordingly, it is not possible to correspond to a case of requiring the approximation data immediately.

SUMMARY OF THE INVENTION

This invention has an object to provide an image processing method, an image processing apparatus and an image processing system that permit to convert data of a small region to a precise approximation data at high speed.

To achieve the above object, the invention adopts following means.

Assuming that the image processing may approximate colors of a small region on color images with plural representative colors, here is explained.

The image processing apparatus is provided with statistic calculating means for calculating a reference value and a statistic of color data composing the small region respectively. The "color data" here indicates coordinates of an arbitrary color space adopted to express the color image. For instance, when RGB ("R" means red, "G" means green, and "B" means blue) are adopted as three primary colors of luminous type, the color data expresses the intensity of color brightness respectively. On the other hand, when CMY ("C" means cyanogens, "M" means magenta, and "Y" means yellow) are adopted as three primary colors of absorbable type, the color data expresses the density of color Respectively. However, the invention may provide a technology applied to either color space likewise.

The image processing apparatus is provided with dividing means for selecting a target color of the small region according to the reference value and the statistic, and then dividing the small region into two sections according to the reference value of the target color. For instance, if an average and a variance are adopted as the reference value and the statistic respectively, the classifying of sections is executed in order from a color having the largest variance. Thereby, it is possible to materialize the dividing of region precisely and at high speed. And the representative colors of each section can be extracted according to the reference value of the target color.

When the number of sections, that is to say, the number of representative colors is less than the specific number, the apparatus is provided with setting means for setting these sections as the small region. Thereby, it is possible to divide the new small region into the specific number, and express the new small region with the specific number of representative colors. At the setting, if the representative colors of each section are adopted as the reference value to calculate the next statistics, it is possible to suppress the processing volume and reduce the processing time.

In addition, the apparatus is provided with color-difference detecting means for detecting the color difference between colors included in the small region. The color difference is defined as the Euclidean distance of color vector in the arbitrary color space adopted above, and is the criterion indicating whether a user can visually distinguish a color from another or not. Then, the apparatus is provided with number-of-colors determining means for determining the number of representative colors to be registered in advance according to the color difference. Thereby, it is possible to suppress the extra repetition of the dividing, and carry out the high speed processing.

Moreover, the apparatus is provided with number-of-colors extracting means for extracting the number of colors included in the small region, and, when the extracted number of colors is less than the required number of the representative colors by comparison with them, number-of-representative-color setting means for setting the extracted number of colors as the specific number. Accordingly, when the number of colors in the color image is small particularly, it is determined first whether the dividing is necessary or not. The extra dividing is prevented from being executed so that the high speed processing can be materialized.

On the other hand, the apparatus is provided with region color data preparing means for preparing region color data combining the region color information expressing each color of picture elements composing the small region by the representative colors and the data of the representative colors by increasing the number of representative colors in sequence. Thereby, since the required region color information and the required representative color can be extracted immediately, it is possible to execute the restoration and the transmission of the color image at high speed. Particularly, the region color data is prepared per the dividing, the invention can correspond to even a case of requiring the approximation data immediately. For example, while the data transmission is performed increasing the number of colors in the color image sequentially, the displaying on the receiving end may be performed increasing the number of colors sequentially.

Further, the apparatus is provided with the number-of-color setting means for setting the required number of colors to display the image for a user, and representative-color extracting means for extracting plural representative colors from the stored data according to the required number of colors, and displayed-color deriving means for deriving the color data of the displayed image by combining the plural representative colors. Thereby, it is possible to prepare the displayed image including the required number of colors at high speed.

Further more, the apparatus is provided with mode switching means for switching the color mode and the monochrome mode, and color-signal selecting means for selecting a specific color signal at the monochrome mode. Therefore, since the image processing can be executed dedicating to the monochrome image, it is possible to reduce the processing time for the monochrome mode more comparing with the color mode.

DESCRIPTION OF THE PREFERRED EMBODIMENTS

Embodiment 1

Figure 1:
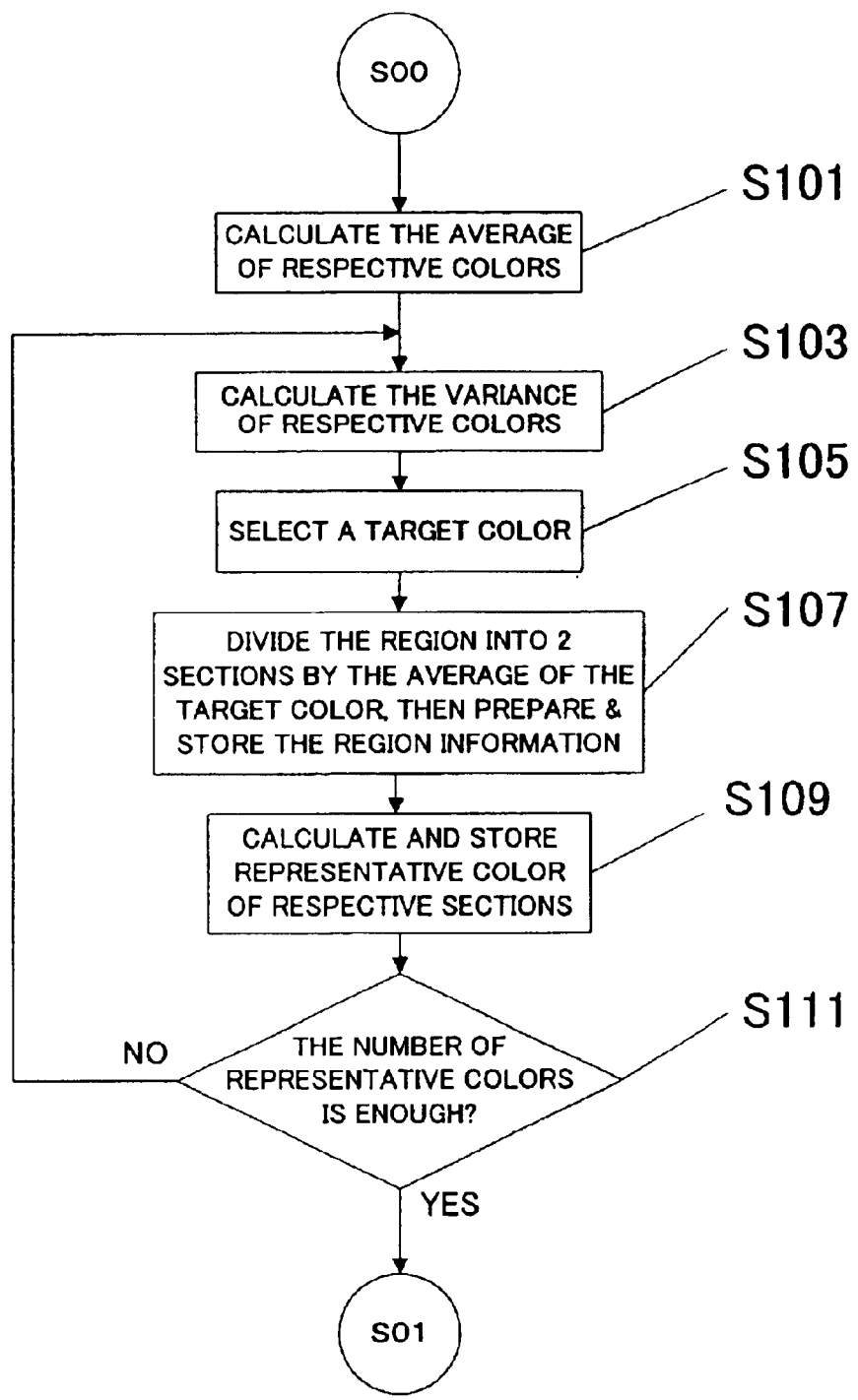
FIG. 1 is a flowchart of the extracting of a representative color in the first embodiment of the invention.

The first embodiment of the invention is explained hereafter referring to the drawings.

The invention relates to a method and an apparatus for extracting the number of representative colors requested by a user in order to approximate a small region on a color image with plural representative colors, and an image processing system to which the apparatus and the method are applied. In the under mentioned explanation, "data of color" ("color data") indicates coordinate values of a specific element in an arbitrary color space applied to the display of the color image. For example, in case of applying RGB ("R" means red, "G" means green, and "B" means blue) as three primary colors of the luminous type, the color data represents the intensity of respective colors brightness, while in case of applying CMY ("C" means cyanogens, "M" means magenta, and "Y" means yellow) as three primary colors of the absorbable type, the color data represents the density of color. The invention can provide a technology applicable to any color space likewise, but this embodiment of the invention describes the RGB space as an example.

As shown in FIG. 1, first of all, regarding the color data of primary colors of respective picture elements within a small region (composed of 4×4=16 picture elements, for example) that is on the color image to be an object of the image processing, all of the color data are added per each basic color, and then divided by the total number of picture elements; thereby the average of respective basic-color data can be calculated (State S00 to Step S101).

Next, the variance of respective basic-color data corresponding to the picture elements is calculated (Step S103). At this time, the simple method of calculating the variance is to accumulate all absolute values of the difference between the average and the color data of respective picture elements. And the color having the maximum of variance is detected, and determined as a target color (Step S105). For instance, if the variance of G is the maximum, G becomes a target color. In the following description, assuming that the target color is G, the explanation is proceeding.

Figure 13:
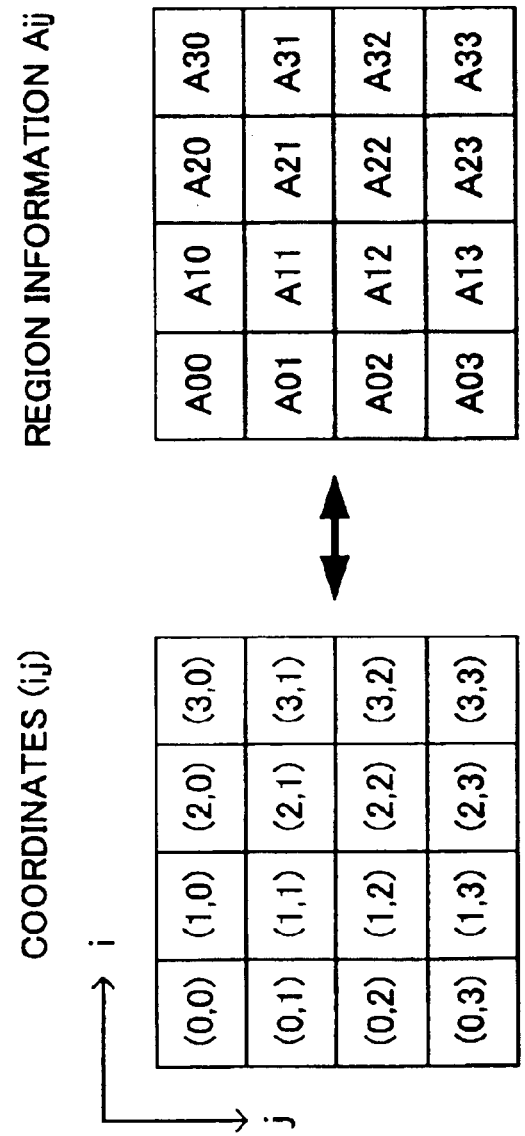
FIG. 13 is an explanatory diagram of the region information.
Figure 14:
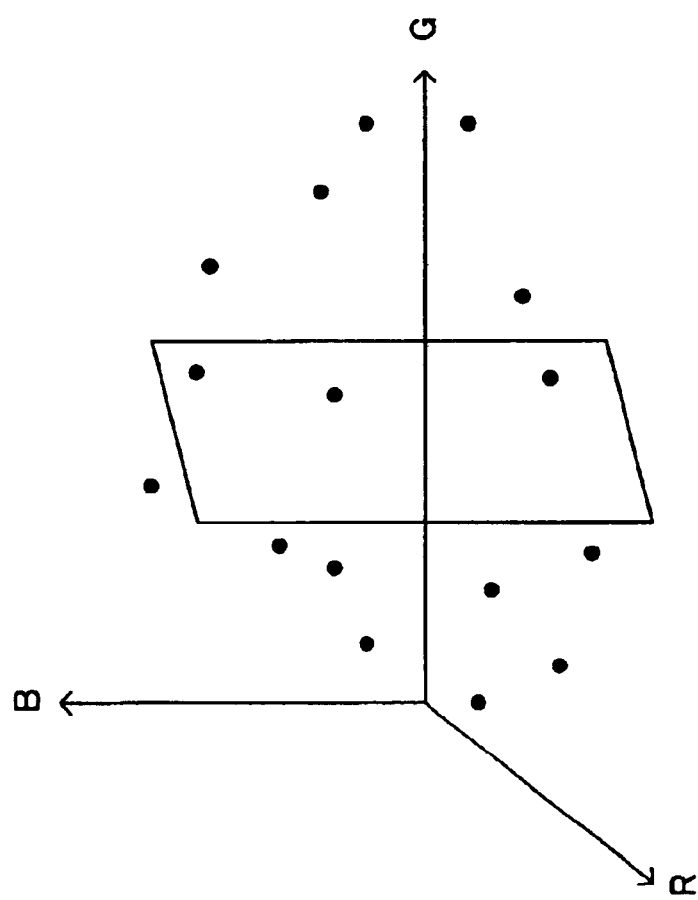
FIG. 14 is an explanatory diagram of the dividing of the small region.
Figure 15:
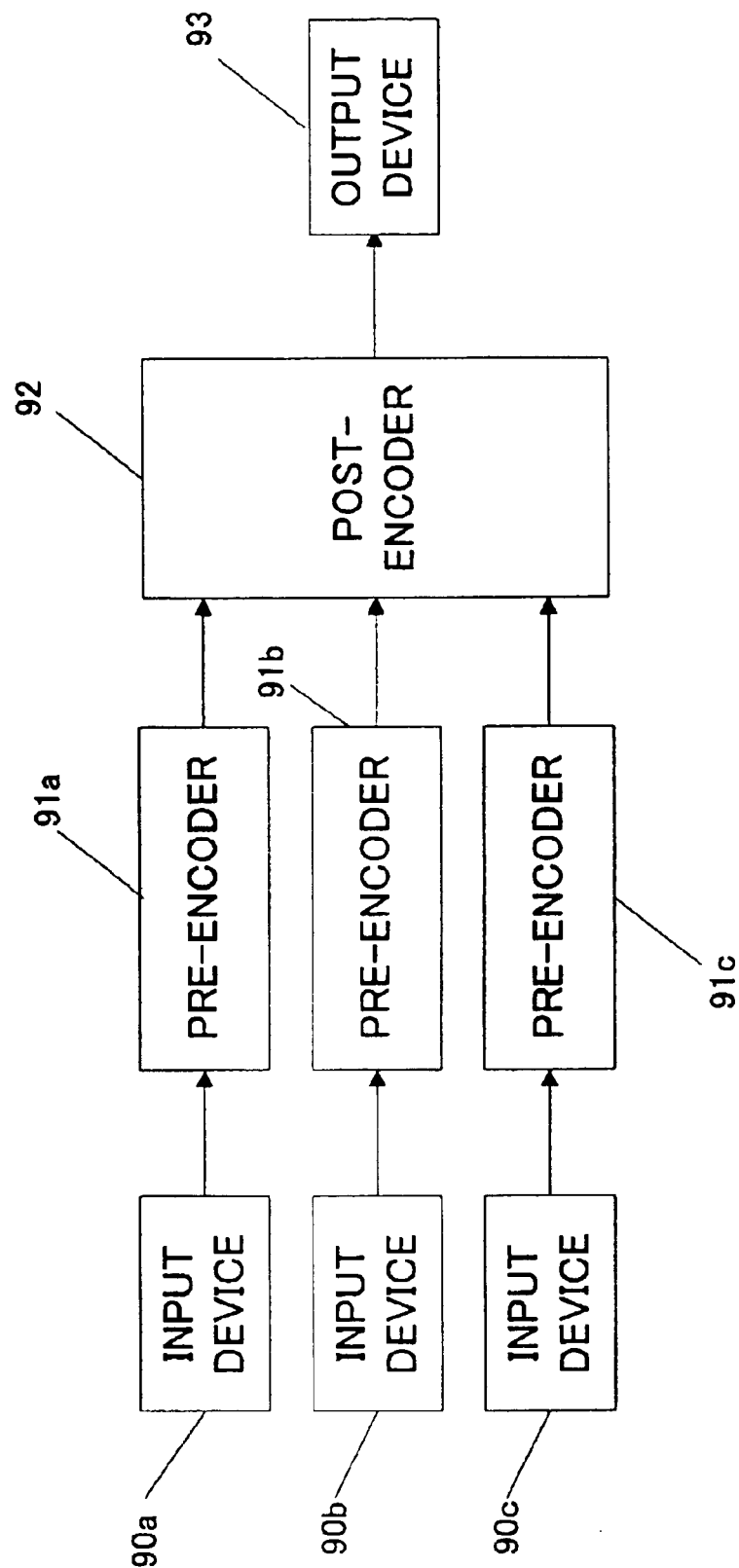
FIG. 15 is a block diagram of the configuration of the conventional image processing apparatus.

After determining the target color as mentioned above, the small region is divided into two sections according to the average of the color data of the target color (Step S107). That is to say, RGB space expressing the small region is divided into two sections by a plane perpendicular to the G axis and passing through the average of the color data of G (See FIG. 14). In addition, in order to indicating a section to which each picture element within the small region should belong, the region information shown in FIG. 13 is prepared, which will be described later.

Next, regarding respective picture elements included in the section the average of color data is calculated for respective RGB colors. One color represented by the average of three primary colors of RGB becomes a representative color of this section (Step S109). Then, the region information and the data of the representative color are stored as the region color data (encoded data) temporarily.

As described above, the small region is divided into two sections and represented by two representative colors. But in case of expressing the small region by more number of representative colors, the two sections are set again as a small region respectively and the same dividing is performed.

In other words, the number of representative colors thus obtained is compared with the number of representative colors requested by a user (Step S111). When the obtained number of representative colors is the same or more than the requested number, the dividing is completed (State S01). On the other hand, when the obtained number of representative colors is less than the requested number, the dividing is repeated again (Step S103 to S109). Accordingly, the steps from the variance calculating (Step S103) to the number-of-representative-color calculating (Step S109) are repeated by n times. Thereby, $2^n$ colors are extracted as representative colors. After the dividing, the representative-colors extracting starts again regarding the small region to be the next object on the color image.

Figure 3:
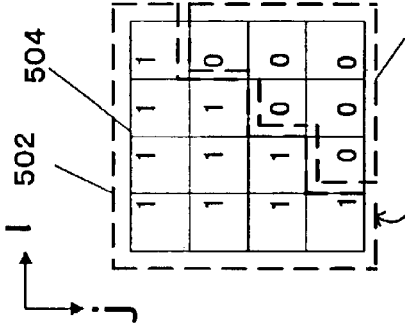
FIG. 3 is an explanatory diagram of the representative color extracting circuit 1 in the first embodiment of the invention.

Here is explained about the materialized example of the numerical processing according to FIG. 3.

First, each color data of three primary colors of RGB of picture elements positioning at the coordinates (i, j), is represented by Rij, Gij, and Bij, respectively. FIG. 3(a) shows each color data Rij, Gij and Bij of picture elements positioning at the coordinates (i, j) within the small region 501 composed of 4×4=16 picture elements to be an object of the image processing. Each color data Rij, Gij and Bij ($0 \leq i, j \leq 3$), that are three primary colors of RGB, has the average, Rave=11.6875, Gave=10.3125, and Bave=9.8125, according to the equation 1 (FIG. 3(b)).

$$Rave = \frac{1}{16} \sum_{i,j=0}^{3} Rij \qquad \text{[Equation 1]}$$

$$Gave = \frac{1}{16} \sum_{i,j=0}^{3} Gij$$

$$Bave = \frac{1}{16} \sum_{i,j=0}^{3} Bij$$

Thereby, the variance of each color data is found to Rd=22.25, Gd=31.75, and Bd=21.375 by the equation 2, respectively (FIG. 3(c)).

$$Rd = \sum_{i,j=0}^{3} |Rij - Rave| \qquad \text{[Equation 2]}$$

$$Gd = \sum_{i,j=0}^{3} |Gij - Gave|$$

$$Bd = \sum_{i,j=0}^{3} |Bij - Bave|$$

Therefore, since the color of which variance is the maximum is G, G is selected as a target color. And by using Gave=10.3125 that is the average of this G, the small region 501 is divided into a section including picture elements having Gij>Gave and a section including picture elements having Gij<=Gave.

The dividing is performed after preparing the region information Aij of 1 bit for the picture elements at the coordinates (i, j). First, the initial value of the region information is defined as Aij=0 for all picture elements. Then, as shown in FIG. 3(e), the picture elements having Gij>Gave are defined as Aij=1, while the picture elements having Gij<=Gave are defined as Aij=0. According to the values of Aij, the small region 501 is divided into a section 502 and a section 503, and the region information 504 (Aij: $0 \leq i, j \leq 3$) is prepared.

Consequently, a representative color C1 of the section 502 is represented by the average (Ra, Ga, Ba) of each color data of picture elements of which region information Aij belong to "1". Likewise, a representative color C0 of the section 503 is represented by the average (Rb, Gb, Bb) of each color data of picture elements of which region information Aij belong to "0". The color data of those representative colors C1 and C0 are stored in a temporary storage means like a register. In this example shown in FIG. 3(f), the averages are Ra=12.6, Ga=11.9, Ba=10.4, Rb=10.16667, Gb=7.666667, Bb=8.33333, and by rounding to the nearest one those are Ra=13, Ga=12, Ba=10, Rb=10, Gb=8, Bb=9, which are process to be integers.

As described above, the small region is divided into two sections 502 and 503; each representative color of sections is extracted as C1 and C0. That is to say, the color of the small region 501 can be approximated with two colors. When a user wants to express the small region 501 with further more representative colors, setting the sections 502 and 503 as a new small region respectively, then it may be executed the dividing like the above in accordance with each color data of picture elements in the new small region. At this time, since each average of color data applied to the dividing has already been stored in the temporary storage circuit (means), it needs not to calculate those averages again.

By the second dividing as mentioned above, each small region is divided into two respectively, and then total four sections are prepared. At this time, like the prescribed processing, the region information is prepared as 1 bit respectively for the small regions 502 and 503. Those region information are added to the region information 504 prepared by the first dividing as a subordinate bit. The storing method of those region information will be described later.

Next, a representative-color extracting circuit 1, which executes the extracting of the representative colors, will be explained hereafter according to FIG. 2.

Figure 2:
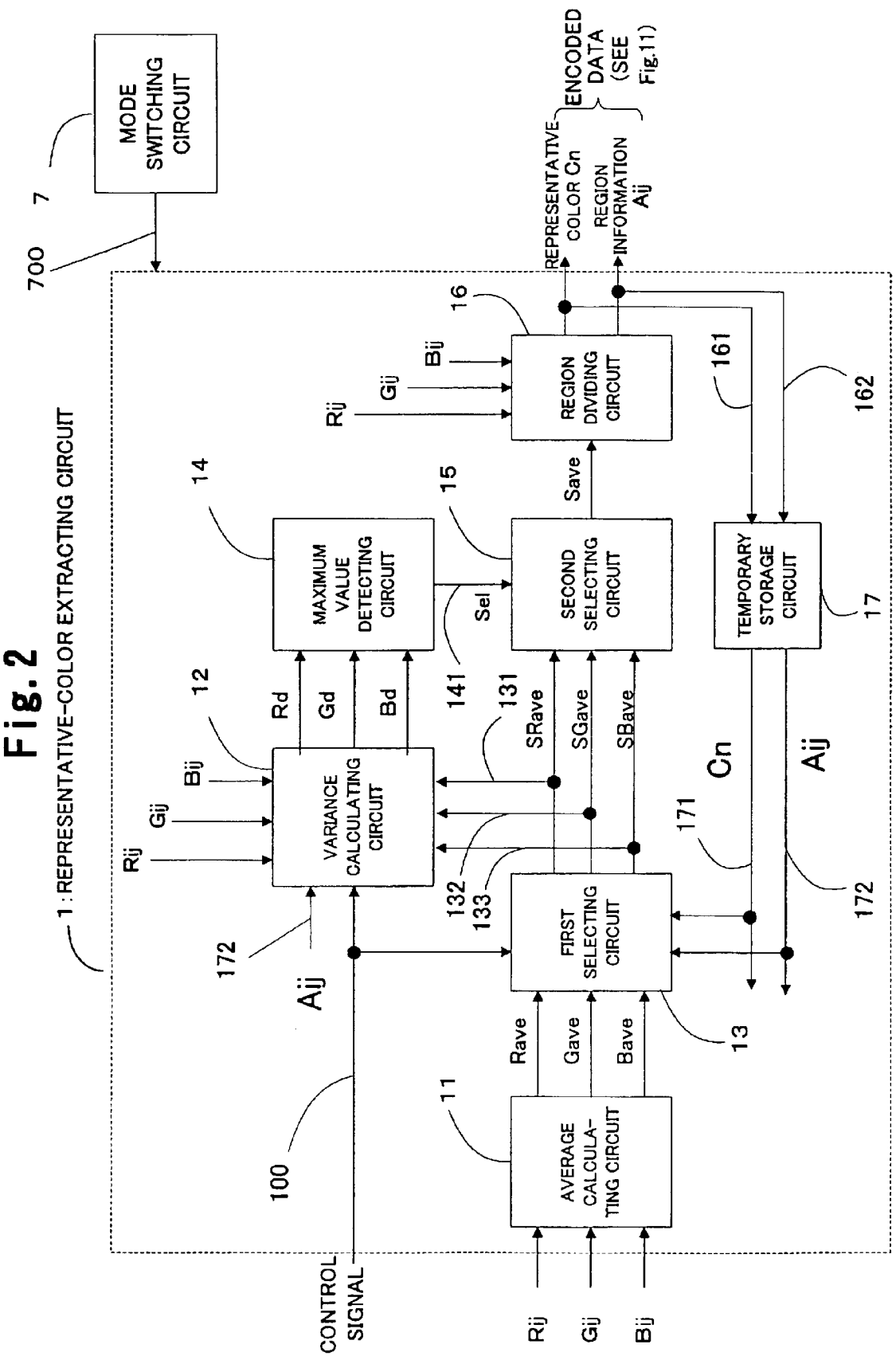
FIG. 2 is a block diagram of the representative color extracting circuit 1 in the first embodiment of the invention.

In FIG. 2, an average calculating circuit 11 adds altogether per color each color data Rij, Gij, Bij of RGB every picture element within the small region, and then divides those values by the number of picture elements within the small region (which are 16, in the above example). Thereby it is possible to calculate the average of each color data Rave, Gave, Bave. When the number of picture elements in the small region is N, the averages of Rave, Gave, Bave can be found according to the equation 3.

$$Rave = \frac{1}{N} \sum_{i,j=0} Rij \qquad \text{[Equation 3]}$$

$$Gave = \frac{1}{N} \sum_{i,j=0} Gij$$

$$Bave = \frac{1}{N} \sum_{i,j=0} Bij$$

As mentioned above, the number of representative colors to be extracted, that is to say, the number of dividing can be designated by a user arbitrarily. After a plurality of the dividing, the representative colors of each small region, that is to say, the average of each color data, is stored in the temporary storage circuit 17. Accordingly, at the first dividing, it is necessary to calculate the average of each color data according to the equation 3, but if the second dividing can apply the average of color data stored in the temporary storage circuit 17, it is possible to execute the dividing at high speed.

In order to apply the average of the color data stored in the temporary storage circuit 17, at the same time of the start of the dividing, a control signal 100 is inputted to the representative-color extracting circuit 1. The control signal 100 gets a value "H" at the first dividing, and a value "L" after the second dividing. And according to the control signal 100, a first selecting circuit 13 selects either one of the data outputted from the average calculating circuit 11 or the data outputted from the temporary storage circuit 17. That is to say, when the control signal is "H", the first selecting circuit 13 selects the output data from the average calculating circuit 11 (Rave, Gave, and Bave), meanwhile, when the control signal is "L", the first selecting circuit 13 selects the representative color data Cn stored in the temporary storage circuit 17, which are outputted as a selected data (SRave, Sgave, and Sbave).

Next, a variance calculating circuit 12 calculates the variance of each color data Rd, Gd and Bd in accordance with the inputted color data Rij, Gij and Bij of picture elements and the above selected data. In case of the dividing after the second time, a small region to be an object of the dividing may be specified according to the inputted region information Aij. The method of calculating the variance is expressed by the equation 2, but the general equation is the following equation 4.

$$Rd = \sum_{i,j} |Rij - SRave|$$ [Equation 4]

$$Gd = \sum_{i,j} |Gij - SGave|$$

$$Bd = \sum_{i,j} |Gij - GRave|$$

The maximum value detecting circuit 14 calculates a color having the maximum variance as MAX(Rd, Gd, Bd), and then detects a color indicating the maximum value as a target color. In case of the materialized example, because of Gd>Rd>Bd, G becomes a target color.

And a second selecting circuit 15 selects the average Save of the target color according to the selected signal (Sel) 141 outputted from the maximum value detecting circuit 14. At present, the target color is G, so that the average Save may be expressed by Save=SGave (FIG. 3(d)).

Next, a region dividing circuit 16 compares the average of the selected target color G and the color data Gi of the selected picture element, and then divides the small region into two sections. If Gij>Save, the region information Aij is "1". If Gij<=Save, the region information Aij is "0". Additionally, two representative colors Cn are calculated for each section, thereafter the average of color data of each picture element of which region information belongs to "1" is represented by C1, and the average of color data of each picture element of which region information belongs to "0" is represented by C0. The representative color C1, C0, and the region information Aij corresponding to each picture element are stored in the temporary storage circuit 17, which are applied to the subsequent dividing. Besides, the averages C1 and C0 are represented by the average (Ra, Ga, Ba) and (Rb, Gb, Bb) of each color respectively, which is the same as prescribed before.

Figure 4:
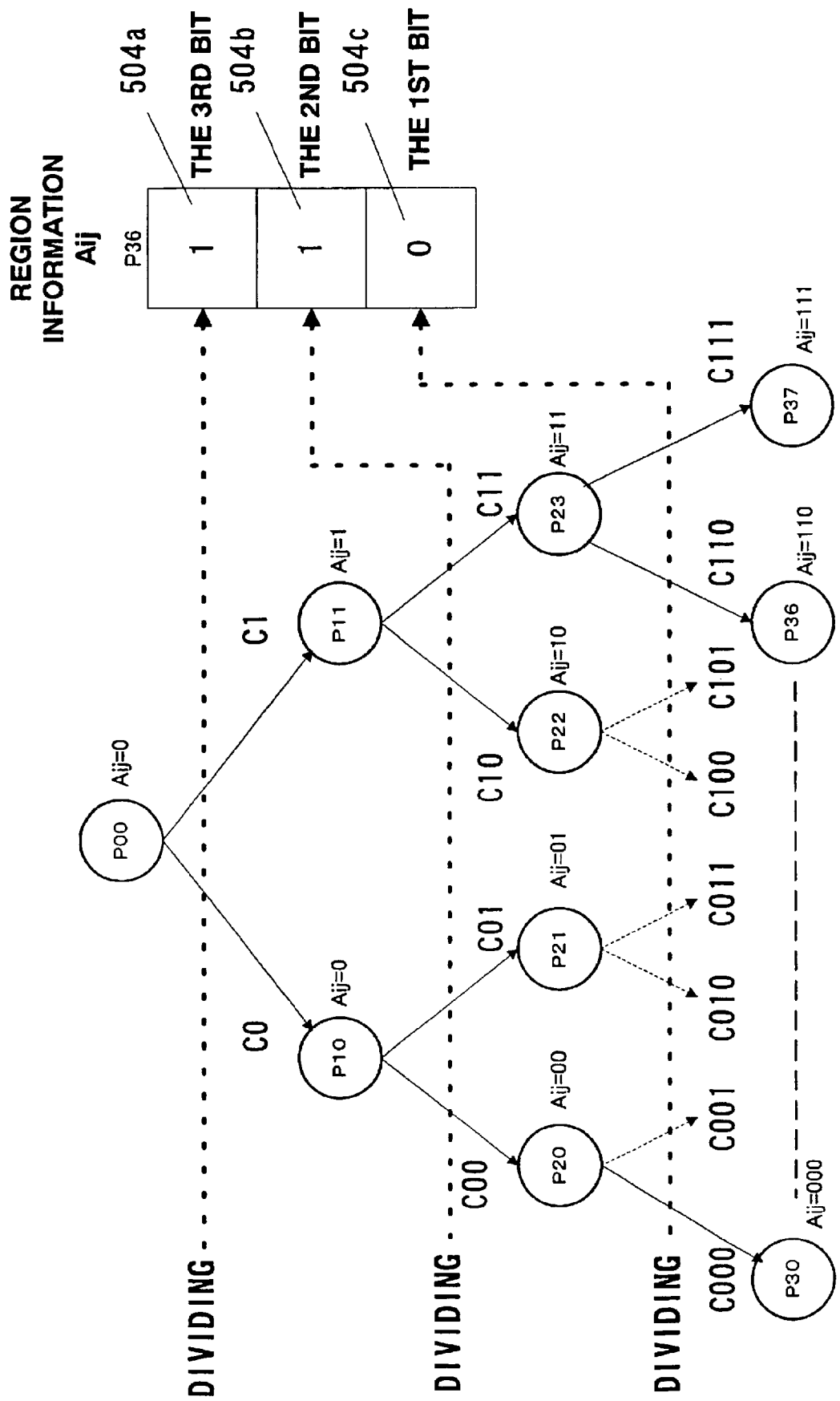
FIG. 4 is an explanatory diagram of the region information storing in the first embodiment of the invention.

Here is explained about the storage method of the region information referring to FIG. 4.

As prescribed description, the representative-color extracting circuit 1 outputs 1 bit of region information and the representative color Cn per section including the picture elements divided to the region at every time of the dividing. The region information prepared at every dividing is added to the region information prepared at the previous dividing as the subordinate bit.

For instance, if it is 8 colors that a user requested as the representative colors, it is necessary to prepare 3 bits of region information in order to distinguish 8 regions corresponding to each representative color. At first, by the first dividing the small region P00 is divided into two sections P10 and P11 of picture elements, for which two representative colors C0 and C1 are extracted respectively. The region information included in the section P10 is represented by Aij=0, while that included in the section P11 is represented by Aij=1. For instance, the region information of the section P11, Aij=1, is stored in the temporary storage circuit 17 as the 3rd bit 504a as shown in the drawing.

In the next step, after the second dividing, the sections P10 and P11 are divided into new two sections of picture elements respectively. For instance, the section P11 is divided into sections P22 and P23, from which representative colors C10 and C11 are extracted. One bit of the region information prepared at this time is added and stored to the subordinate bit (the 2nd bit) 504b to the 3rd bit 504a. In other words, the region information of the section P23 is represented by Aij=11, for example.

Finally, by the third dividing, 8 sections of P30, P31, P32, P33, P34, P35, P36 and P37 are prepared. The region information prepared at the same time is added and stored to the subordinate bit (the 1st bit) 504c to the 2nd bit 504b like the above. For instance, the region information of the picture elements included in the section P36 (the representative color C110) is represented by Aij=110.

As mentioned above, by storing the region color data one after another in the state of layer structure at every dividing, the image processing system can carry out the transmission of the color image at high speed and effectively. The region information is prepared correlating with each picture element composing the small region to be an object, and the contents will be explained later.

Figure 5:
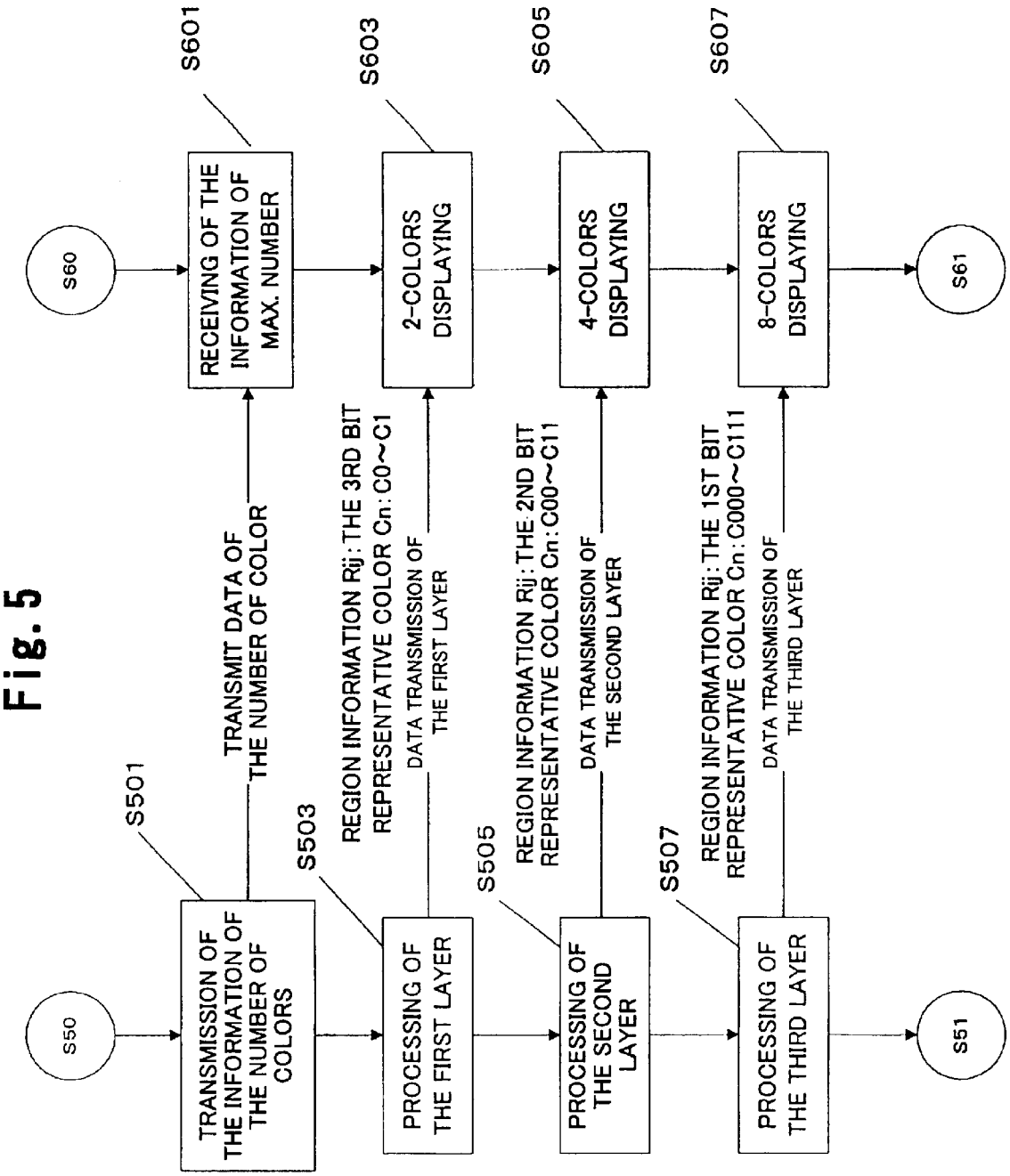
FIG. 5 is an explanatory diagram of the procedure of the transmission data in the first embodiment of the invention.

FIG. 5 shows an explanatory diagram showing the procedure of the data transmission. Here is explained in case of performing the data transmission between different devices (for example, a digital integrated apparatus A, and a personal computer B). The state S50 indicates the state of the digital integrated apparatus A, while the state S60 indicate the state of the personal computer B.

First, the digital integrated apparatus A gives the number of representative colors of the color image to be transmitted to the personal computer B (Step S501). Here, the number of colors should be 8 according to the prescribed example. At receiving the notice, the personal computer B understands the number of colors of color image (8 colors) (Step S601).

Figure 11:
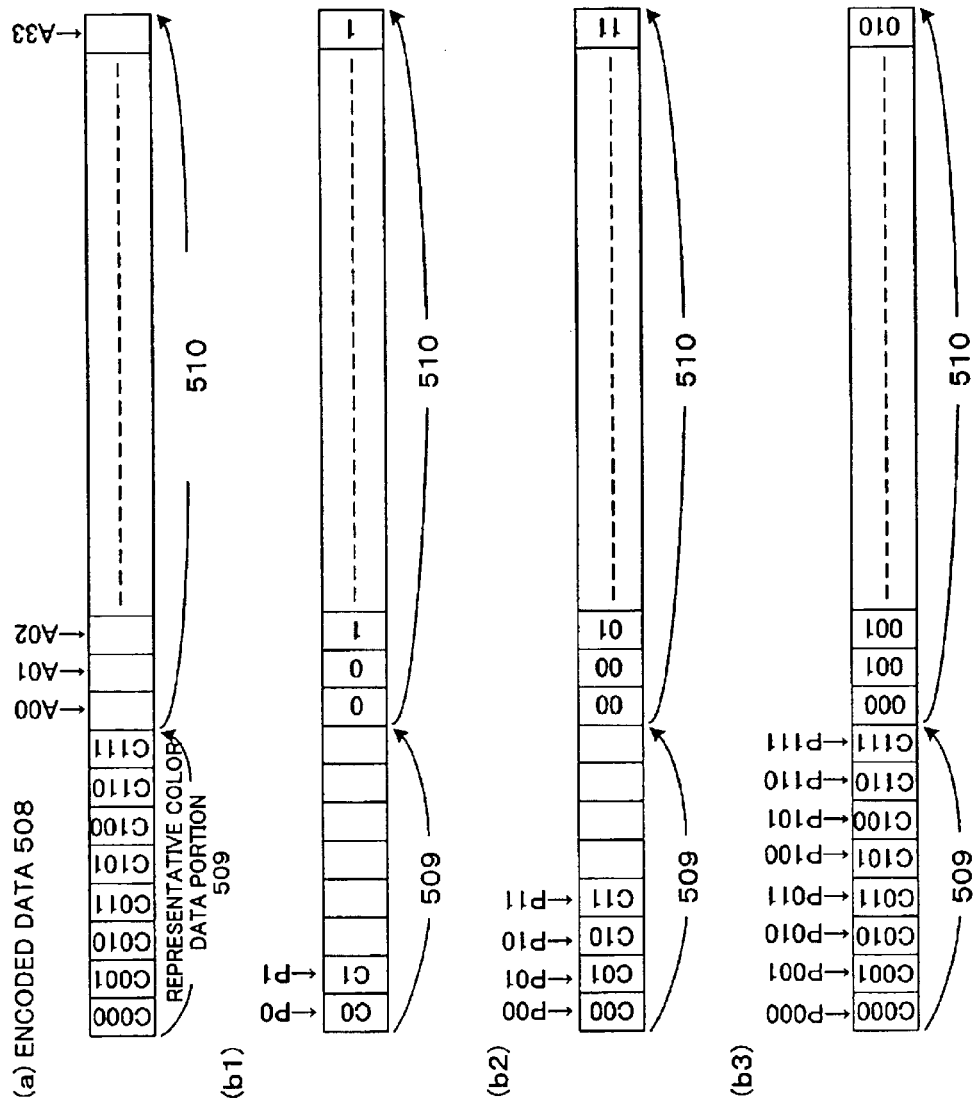
FIG. 11 is a configuration diagram of the encoded data in the fifth embodiment of the invention.

Next, the digital integrated apparatus A transmits to the personal computer B the representative colors C0 and C1 and the 3rd bit of the region information Aij prepared at the first dividing in the form of the data configuration shown in FIG. 11(b1) (Step S503). And the personal computer B receives the representative colors C0 and C1 and the 3rd bit of the region information Aij, and then stores them in a storage medium like a hard disk, a memory card, or a working memory. Moreover, if necessary, the personal computer B restores the color image, and performs 2-colors displaying by approximating the color of the picture elements included in each small region with 2 representative colors (Step S603).

Next, the digital integrated apparatus A transmits to the personal computer B the representative colors C00, C01, C10 and C11 and the 2nd bit of the region information Aij prepared at the second dividing (Step S505). And the personal computer B receives the representative colors C00, C01, C10 and C11 and the 2nd bit, and then stores them. In addition, the personal computer B restores the color image, and replaces the data of each small region with the approximation data of 4 colors, and then updates to the 4-colors displaying (Step S605).

Moreover, the digital integrated apparatus A transmits to the personal computer B the representative colors C000, C001, C010, C011, C100, C101 and C111 and the 1st bit of the region information Aij prepared at the third dividing (Step S507).

And the personal computer B receives the representative colors C000, C001, C010, C011, C100, C101 and C111 and the 1st bit of the region information Aij, and then stores them. And the personal computer B restores the color image, and replaces the data of each small region with the approximation data of 8 colors, and then updates to the 8-colors displaying (Step S607).

As mentioned above, the digital integrated apparatus A performs the data transmission from the 3rd bit of data to the 1st bit of data one after another, so that the personal computer B can display the image by increasing the number of colors, like the 2-colors displaying, the 4-colors displaying, and the 8-colors displaying. The technology is effective in case of the following case.

In case where the transmission capability is limited, after receiving the rough characteristics of the image in advance, the device on the receiving end understands the outline previously and then receives the precise contents. By such method, it is possible to reduce the waiting time of a user. If a user judges over the receiving that he does not need the image, he can stop the receiving as soon as possible.

As the same technology, it is used to apply the method of increasing the resolution in sequential order because the thinning out can carry out this method easily. However, regarding the number of colors, although the reducing of the number of the gradation bit is made practicable, it has a problem that the deterioration of the picture quality is large. As a method improving this problem, the representative-color extracting in the first embodiment of this invention can suppress the deterioration of the picture quality and perform the color displaying precisely.

In the above description, the dividing is performed on the basis of the average and the variance; however, the processing may be performed according to the other algorithm.

Embodiment 2

In the first embodiment, the representative-color extracting circuit 1 can extract 8 representative colors requested by a user as an approximation data of the small region. Thereby, it is possible to suppress the deterioration of the picture quality of the natural image and reduce the number of colors. Regarding the reduced number of colors, the color processing (the color changing, the color correction) or the editing such as the enlargement and the reduction is performed; thereby it is possible to reduce the processing volume. Therefore, it is possible to carry out the high speed processing.

However, in the natural image a region that does not require many colors because color changes very little or a user cannot judge the change visually is mixed with a region that requires many colors because the change of color is large. In this case, when the representative colors are extracted fixing the number of colors, the number of the representative colors is over the required number or not enough to displaying. Therefore, executing the unnecessary processing wastes the processing time, and the deterioration of picture quality occurs because of lacking the number of colors. The invention estimates the proper number of representative colors enough to approximate to the color of the small region, and then performs the extracting of the representative colors. Thereby it is possible to carry out the high speed processing and the improvement of the precision.

The effective method for the high speed and high precise processing will be explained here according to the flowchart in FIG. 6.

Figure 6:
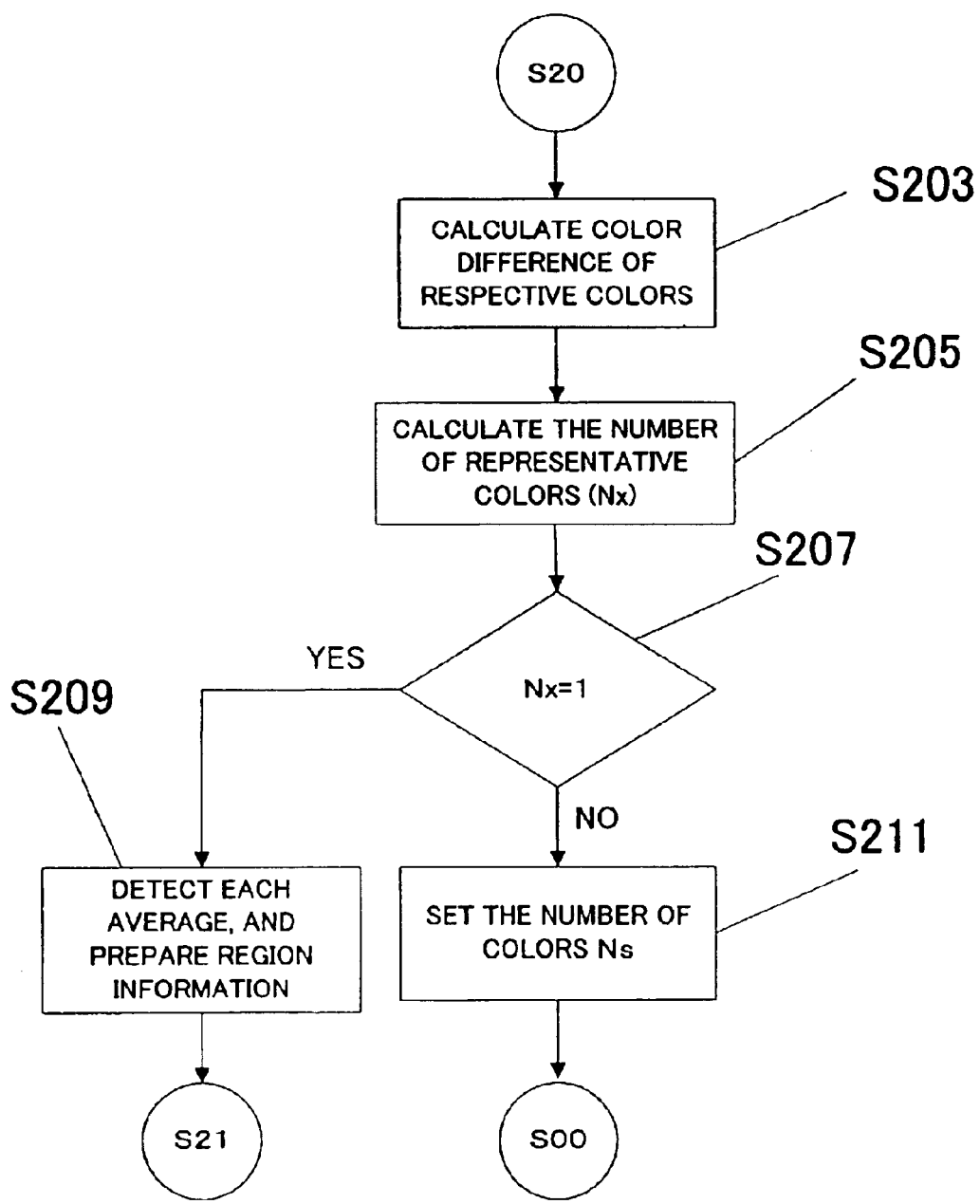
FIG. 6 is a flowchart of the automatic setting of the number of colors in the second embodiment of the invention.

In FIG. 6, first the maximum color difference X in the small region is detected (Step S203). The color difference means the Euclidean distance of color vector in a color space, and a criterion showing whether different two colors can be distinguished visually from each other.

For the reference information, "the tolerance of color difference" by Japanese Color Research Institute is explained in Table 1.

TABLE 1

| Description | Color Difference ΔE | Degree of Color Difference | Example Of Standard |
| --- | --- | --- | --- |
| Not-identifiable region | 0.0~0.2 | Within the scope of tolerance of a color measuring machine adjusted specially, it is not identifiable for human. | |
| Discrimination limit | 0.2~0.4 | Within the scope of the restoration capability of a color measuring machine adjusted specifically, it is the limit discriminated by a well-trained person according to the restoration performance. | JIS L 0804 JIS L 0805 |
| Tolerance of the AAA class | 0.4~0.8 | It is the limit able to define the standard of the precise difference based on the restoration of the visual color judgment. | The special standard of agreement among the concerned parties |

TABLE 1-continued

| Description | Color Difference ΔE | Degree of Color Difference | Example Of Standard |
|---|---|---|---|
| Tolerance of the AA class | 0.8~1.6 | It is the level that the color difference can be found by the adjacency comparing, and within the scope of tolerance in the general color difference measuring machine. | Standard of Defense Agency, Standard of National Police Agency, Standard of general shipping examination |
| Tolerance of the A class | 1.6~3.2 | It is hard to be found by comparing the separating space, and the level in which it seems to be the same color in general | JIS Z 8721 JIS L 0600 Tolerance of general color samples |
| Tolerance of the B class | 3.2~6.5 | It is treated as the same color on the impression level, but regarding the paintings treated as another color. | Tolerance of color management for heterogeneous material JIS E 3305 |
| Tolerance of the C class | 6.5~13 | It is the standard color of JIS and equivalent to color difference between the Mansell colors. | JIS S 6016 JIS S 6024 JIS S 6037 |
| Tolerance of the D class | 13~25 | It is easy to be discriminated by the name of system color, and exceeding this the color changes to another. | JIS Z 8102 JIS D 0202 JIS E 3701 JIS Z 9101 JIS Z 9102 |

The color difference in the above Table is calculated about the L*a*b* space instead of RGB space. However, as the value of the color difference gets smaller, it becomes harder to distinguish the color visually. And this is established in general even if the adopted color space is different. Therefore, the second embodiment of the invention explains the RGB space as an example like the first embodiment.

Fixing one color of vector, for example, the color vector (R00, G00, B00) of a picture element at the coordinates (0, 0) in the small region of 4×4=16 picture elements, the maximum color difference X is calculated in accordance with the Euclidean distance between the color vector (R00, G00, B00) and the color vector (Rij, Gij, Bij) of a picture element of the other coordinates (i, j) by using the equation 5.

$$X = \max\{(R00-Rij)^2 + (G00-Gij)^2 + (B00-Bij)^2\}^{1/2} \quad \text{[Equation 5]}$$

A reference color-difference Y, which depends on the adopted color space, stands for a maximum of the color difference that cannot be recognized visually in the color space to be an object. At this time, the number of colors required so as not to recognize the maximum color-difference X visually is expressed as X÷Y.

The ratio of the maximum color-difference X to the reference color-difference Y, that is to say, X÷Y, is determined as the number of representative colors Nx (Step S205). When Nx<1, the maximum color-difference X is equivalent to the sate that the change of color cannot be recognized visually. Therefore, Nx is determined as Nx=1.

Next, according to the number of representative colors Nx, different processing is performed respectively (Step S207). When Nx=1, the representative-color extracting is not be executed. That is to say, since the dividing is not executed, the average of each color data is calculated per color and become to be the representative color (Step S209). And regarding the region information, the same value is set on all picture elements (for example, Aij=1), and then the processing corresponding to the number of representative colors Nx is completed (State S21).

On the other hand, when Nx>1, the number of colors Ns that satisfies Nx<Ns(=2ⁿ) is determined as the number of representative colors Nx, and then the dividing shown in FIG. 1 is executed by n times (Step S211 to State S00). For instance, when Nx=7, n=3 satisfies the condition, and then Ns=8. Therefore, by the three times of dividing, the extracting of 8 representative colors is executed. As a result, it is possible to ensure the sufficient precision.

As described above, in the second embodiment, since the number of representative colors is predetermined in accordance with the maximum color difference in the small region, it is possible to ensure the number of colors required visually, and also suppress the unnecessary repetitions of the dividing.

Embodiment 3

The image processing method and apparatus in the third embodiment of the invention will be described here.

The images such as graphs and tables prepared by a computer have generally the less number of colors. If the number of colors in a small region to be an object of the dividing is less than that of the representative colors determined by a user, the processing without the representative-color extracting can suppress the processing volume and thereby it is possible to carry out the high speed processing. The number-of-color extracting effective to the high speed processing will be explained here according to the flowchart in FIG. 7.

Figure 7:
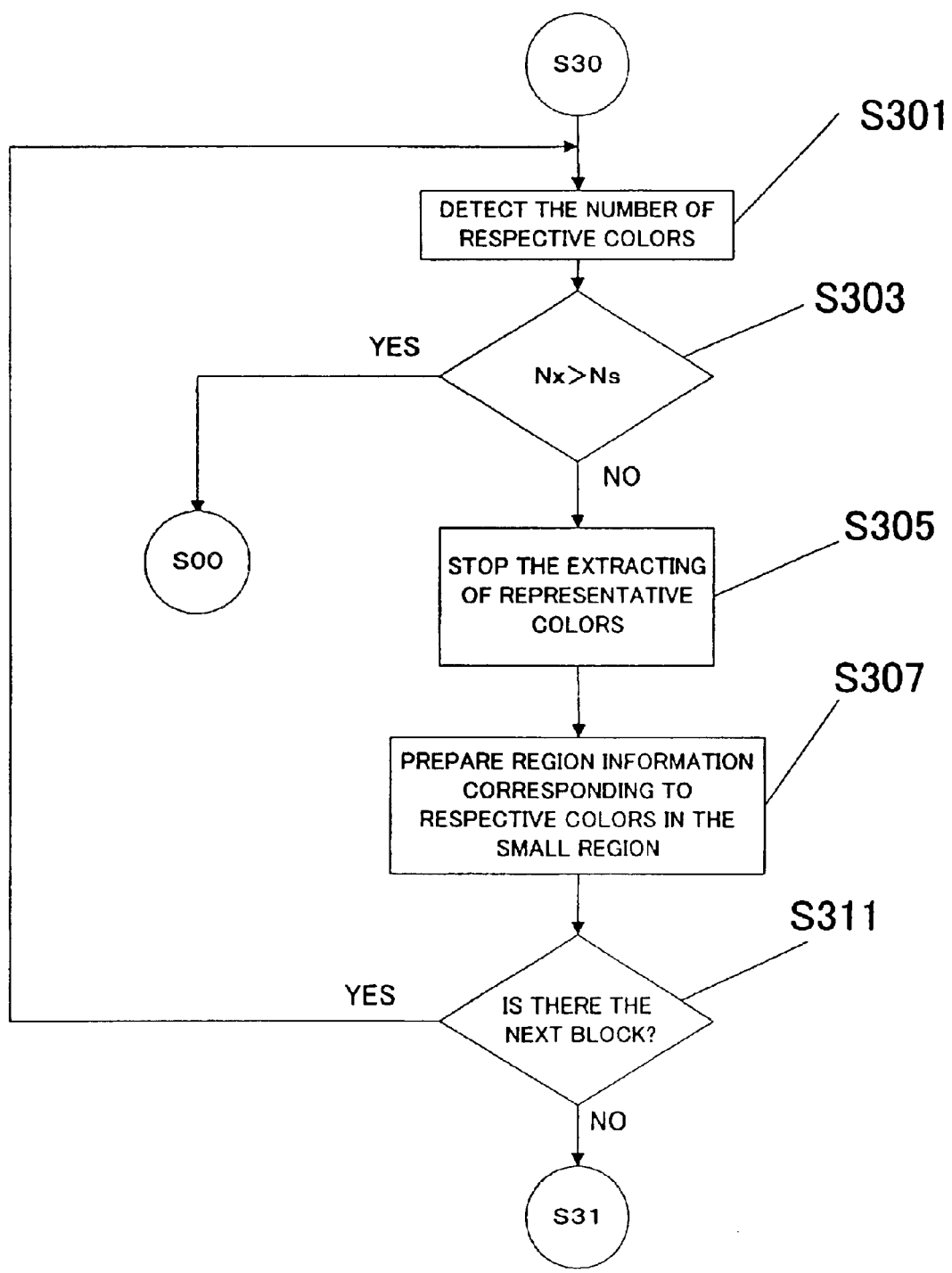
FIG. 7 is a flowchart of the judging of the number of colors in the third embodiment of the invention.

In FIG. 7, the number of colors Nx to express the color of the small region can be extracted in advance by calculating the number of color vectors of picture elements where the color difference is 0 (Step S301).

Next, comparing the extracted number of colors Nx and the specific number Ns of representative colors, if Nx>Ns, the general representative-color extracting shown in FIG. 1 is executed (Step S303). If Nx<Ns or Nx=Ns, the representative-color extracting stops (Step S305).

Next by allocating a region to each color in the small region respectively, the region information is prepared (Step S307). For instance, if the used number of colors is 4, either one value of 00, 01, 10, or 11 is allocated as Aij.

In addition, if there remains a small region (a block region) to be a next object, the number-of-color extracting is performed for the next object region. If there remains no small region to be the object, the number-of-color extracting is completed (Step S301 or State S31).

Figure 8:
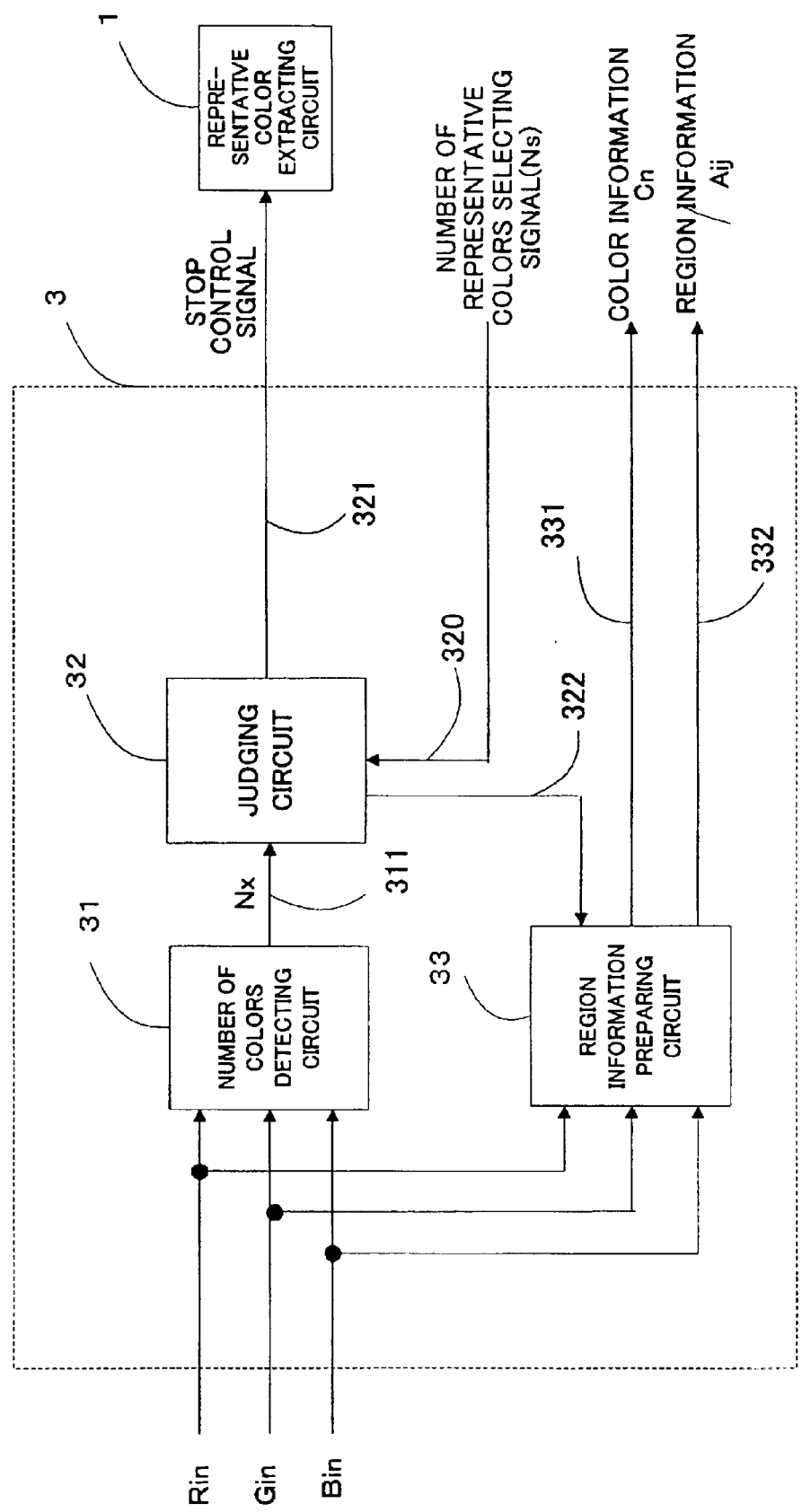
FIG. 8 is a block diagram of the number-of-color judging circuit 3 in the third embodiment of the invention.

FIG. 8 shows a block diagram of the number-of-color judging circuit 3 that permits to materialize the number-of-color extracting.

The number-of-color detecting circuit 31 detects the number of colors Nx (311) of the small region from the inputted color data Rij, Gij, and Bij. Comparing the number of colors Ns extracted from the small region and the number of colors Ns (320) of representative colors determined in advance, if Nx<Ns or Nx=Ns, the judging circuit 32 outputs to the representative-color extracting circuit 1 a stop signal 321 to stop the processing. Since the representative-color extracting circuit 1 is controlled by the stop signal 321, at receiving the instruction of the stop the representative-color extracting circuit 1 stops the operation.

At the same time, the region information preparing circuit 33 receives the instruction of preparing the region information by the control signal 322 from the judging circuit 32. According to the instruction of preparing the region information, the region information preparing circuit 33 prepares the region information Aij corresponding to respective color Cn (331) of the small region. For instance, the used number of colors is 4, either one value of 00, 01, 10, or 11 is allocated as Aij (332).

On the other hand, if Nx>Ns, the representative-color extracting circuit 1 performs the general representative-color extracting explained in the first embodiment.

As mentioned above, in the third embodiment, when the number of colors expressing the color of the small region is less than the number of representative colors determined in advance, the dividing of the small region is not executed. Therefore it is possible to avoid the unnecessary execution of the dividing.

Embodiment 4

Figure 9:
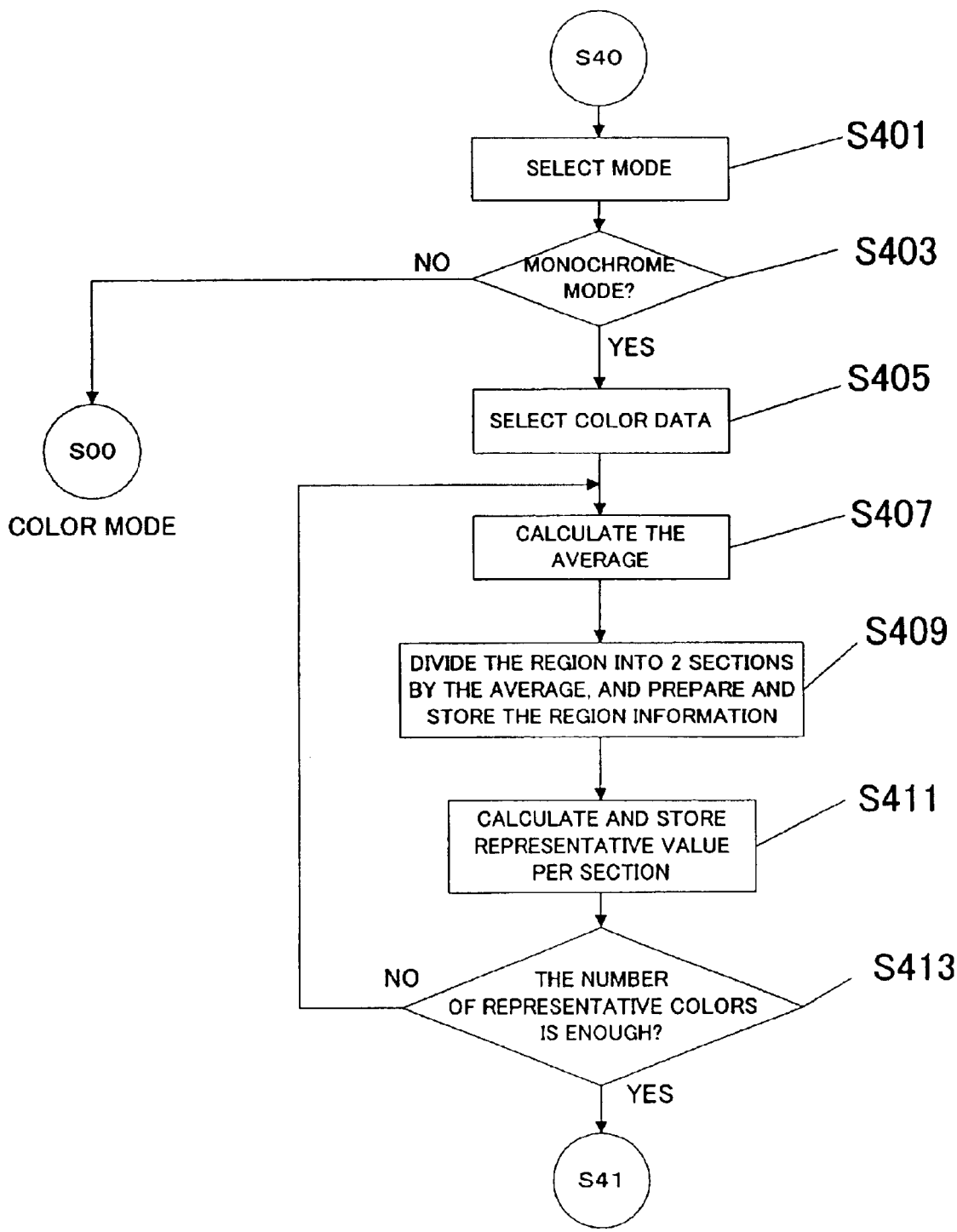
FIG. 9 is a flowchart of the monochrome processing in the fourth embodiment of the invention.

Referring to FIG. 2 and FIG. 9, the image processing method and apparatus in the fourth embodiment is explained.

The image to be an object of the processing of the invention includes not only color images but also monochrome images. In this case, since the data ratio of three primary colors of RGB for every picture element is the constant, it is enough to execute the dividing of the small region giving attention only to the specific color components. Accordingly, there is no need for the selecting of the target color by calculating the variance of each color. The extracting of the specific number of representative colors, which is executed for the monochrome image, means that the specific number of gradation expresses the monochrome image.

In FIG. 9, selecting the color mode or the monochrome mode depending on the object image of the dividing, the mode is determined (Step S401). According to the selected mode, in case of the color mode, the dividing and the representative-color extracting are performed as shown in FIG. 1. On the other hand, in case of the monochrome mode, the processing follows to the under mentioned step (Step S403 to S405).

In the monochrome mode, one color component to be applied to the color data is determined. For example, Gij is selected here. Regarding the color component to be applied here, it is possible to use the brightness signal L synthesizing R, G and B. The correlation between the brightness signal L and the RGB data is represented by L=0.3×R+0.59×G+0.11×B.

After the color component is thus selected, the average E in the small region can be detected regarding the color data of the selected color component (Step S407).

When using the average E as the condition of the dividing, if Gij>E, Aij=1. If Gij<E or Gij=E, Aij=0. Accordingly the small region is divided into two sections. And then the obtained region information Aij is stored in the temporary storage circuit (Step S409).

Next, respective averages of two sections are determined as the representative gradation (the representative value) (Step S411).

In addition, judging whether the specific number of representative gradations is ensured or not (Step S413), if not, the dividing is repeated sequentially (Step S413 to S407). When the specific number of representative gradations is ensured, the representative-color extracting is completed for the monochrome mode (State S41).

The operations of the above processing are explained in detail according to FIG. 2.

In FIG. 2, a mode switching circuit 7 inputs a mode signal 700 into the representative-color extracting circuit 1. If the mode signal 700 is the monochrome mode, the variance calculating circuit 12 and the maximum value detecting circuit 14 stop the working.

And the average calculating circuit 11 calculates the average of Gij.

Next, the first selecting circuit 13 selects Gave. Since the second selecting circuit 15 always selects SGave, Save=SGave.

The region dividing circuit 16 compares Save and Gij, and then prepares the region information Aij. That is to say, if Gij>Save, Aij=1, on the other hand, if Gij<Save or Gij=Save, Aij=0. According to those values, the picture elements included in the small region are divided into two sections. And each average of divided section (161) and the region information Aij (162) are stored in the temporary storage circuit 17.

At the dividing after the second time, the control signal 100 inputs the representative value Cn (171) and the region information (172) that are stored in the temporary circuit 17, and then the first selecting circuit 13 selects each representative value of section.

As described above, the invention in the fourth embodiment enables the monochrome mode processing to stop the unnecessary operations by switching the color mode and the monochrome mode and using the processing circuits shared in the color mode. Therefore it is possible to carry out the high speed processing for the monochrome images.

Embodiment 5

Figure 10:
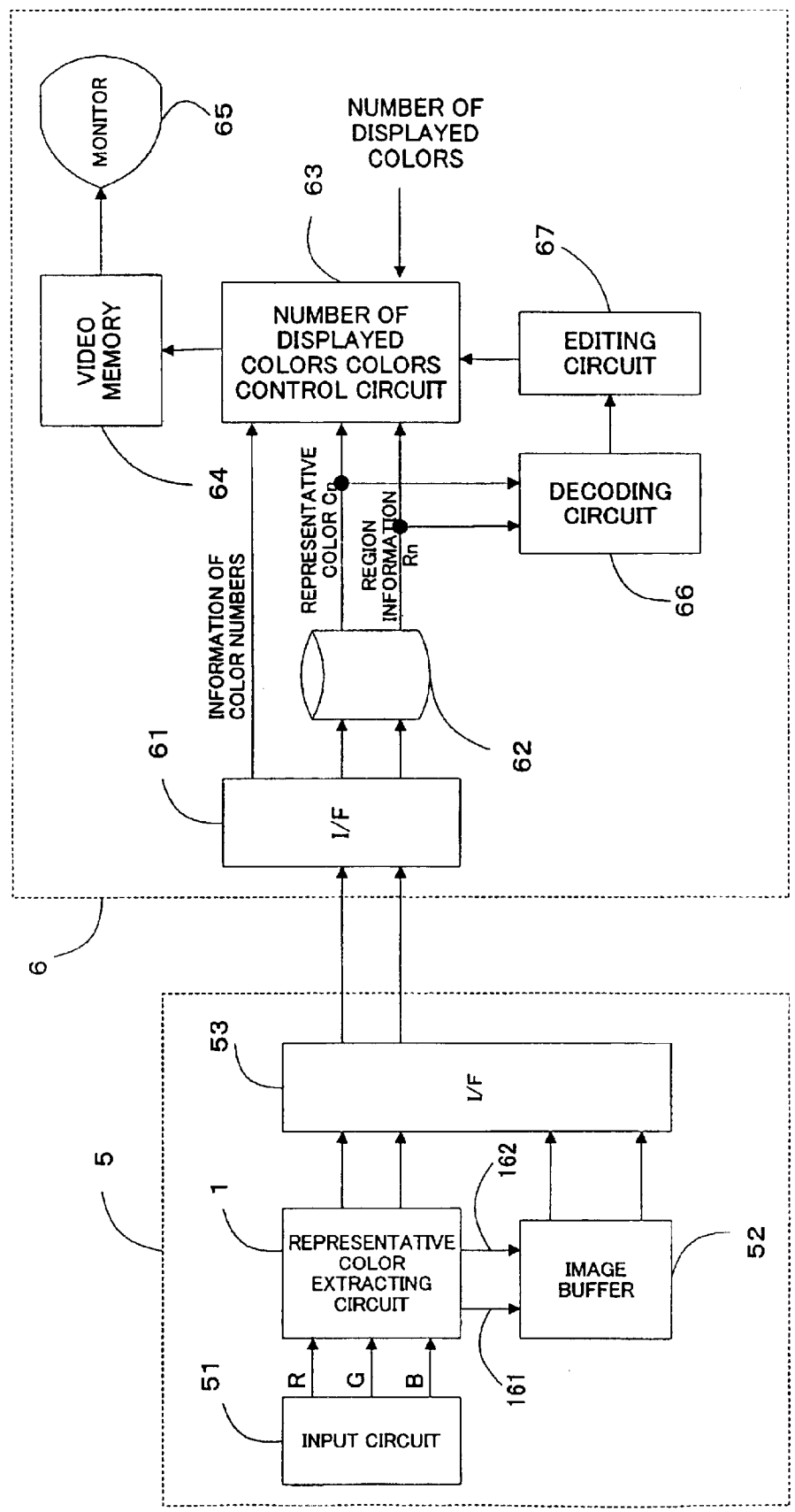
FIG. 10 is a block diagram showing the configuration of the input device and the output device in the fifth embodiment of the invention.
Figure 12:
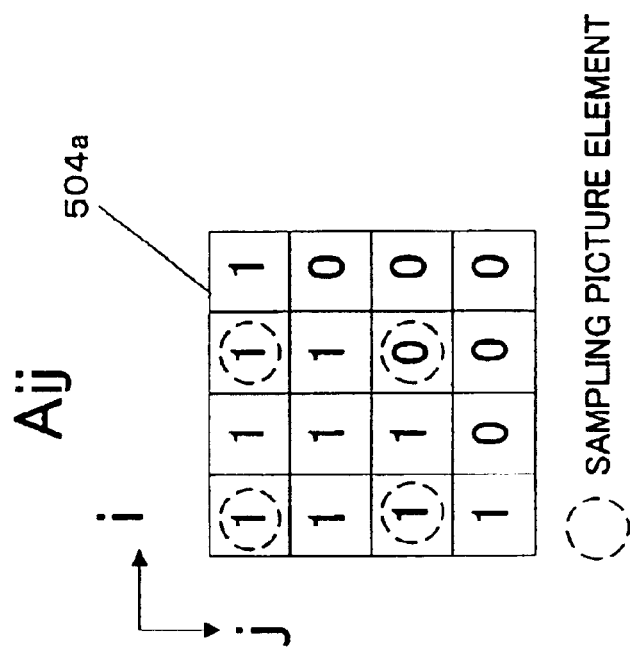
FIG. 12 is an explanatory diagram of the reducing in the fifth embodiment of the invention.

According to FIG. 10, FIG. 11, and FIG. 12, here is explained the image processing system in the fifth embodiment of the invention.

In FIG. 10, an image input unit 5 is a camera, a scanner, a digital still camera, or the like, and prepares an encoded data of the representative color Cn and the region information Aij from the RGB data obtained from an input circuit 51 by using the representative-color extracting circuit 1. While the encoded data is stored in an image buffer 52, the data is transmitted to an image output unit 6 like a personal computer via interface 53. It is arranged that the prepared encoded data be transmitted whenever the representative color is extracted, so that it may be possible to materialize the data transmission with increasing the number of colors sequentially, which is described in the first embodiment.

The representative-color extracting circuit 1 can be utilized to the data compression because the circuit 1 can produce the image with visually high quality with suppressing the number of colors, as described in the first to the fourth embodiment. It is of course that the representative-color extracting circuit is utilized to the data reducing in case of the small transmission capability. As described below, the representative-color extracting circuit 1 can be applied to the image transmission method at real time toward the image output unit 6 because it is easy to performing the encoding.

The image output unit 6 records and stores the transmitted encoded data in a memory medium 62 such as a hard disk, a random access memory, or the like. A number-of-displayed-color control circuit 63 received the encoded data (the region color data) (Cn, Aij) from an interface 61, and then restores the encoded data. The restored data is transmitted to a video memory 64 and then displayed on a monitor 65. At the restoring, the standard number of displayed colors can be inputted in advance, however, when the encoded data (Cn, Aij) is transmitted increasing the number of colors sequentially, it is arranged that the image output unit 6 first receives the information regarding the representative colors (8 colors in the above example) from the image input unit 5. Then, as explained in the first embodiment referring to FIG. 3, by updating the stored data in the video memory 64 increasing the number of displayed colors sequentially, it is possible to display the image with high precision one after another, together with reducing the waiting time.

For instance, in case of confining the bandwidth of transmission pass between the image input unit 5 and the image output unit 6, a user prefers to display from the image with the less number of colors by increasing the number of colors sequentially. Thereby, it is possible to reduce the waiting time till the display the outline of the image.

In addition, the encoded data stored in the storage medium 62 is decoded by a decoding circuit 66, and then outputted to the number-of-displayed-colors control circuit 63 while performing the writing and reducing by an editing circuit 67. The processed data is written into the video memory 64, and displayed by the monitor 65. As a result, it is possible to the image editing and displaying at high speed because the data size is small.

The encoded data is configured at fixed data size when the number of representative colors is a constant. FIG. 11 shows a configuration of the encoded data 508 when the color of the small region of 4×4=16 picture elements is approximated with 8 colors. A representative-color data portion 509 stores the representative-color data for 8 colors, C000, C001, C010, C011, C100, C101, C110, and C111. A region information data portion 510 stores the region information Aij ($0 \leq i, j \leq 3$) corresponding to respective picture elements. Those 16 units of the region information Aij($0 \leq i, j \leq 3$) may be arranged in the arbitrary order. However, in this embodiment, the first 4 units are the region information of picture elements corresponding to the coordinates (0, j) listed in ascending order of j-column, in the order of A00, A01, A02, and A03. Likewise, the next 4 units are the region information of picture elements corresponding to the coordinates (1, j) listed in ascending order of j-column, and then the next 4 units the region information of picture elements corresponding to the coordinates (2, j) listed in ascending order of j-column, and then the last 4 units are the region information of picture elements corresponding to the coordinates (3, j) listed in ascending order of j-column.

The preparing of the encoded data is explained according to FIG. 4.

After extracting the representative colors C0 and C1 and preparing the 1 bit of region information Aij=0,1 at the first dividing, those information are stored respectively in the representative-color data portion 509 and the region information data portion 510 of the encoded data 508, as shown in FIG. 11(b1), for example. Here are described as A00=0, A01=0, A02=1, . . . , A33=1, which means that the color data at the coordinates (0, 0), (0, 1), (0, 2), . . . , (3, 3) of the corresponding picture elements are respective color data Co, C0, C1, . . . , C1 indicated by the pointer P0, P0, P1, . . . , P1. However, since only two colors are determined as the representative colors at this step, the field of the representative-color data portion 509 other than C0 and C1 is assumed to store 0 as the initial data.

Subsequently, the second dividing extracts the 4 representative colors, C00, C01, C10, and C11, and prepares 2 bit of region information Aij=00, 01, 10, and 11. At this time, adding four of the representative-color data and the subordinate 1 bit of the region information, the encoded data 508 is configured as shown in FIG. 11(b2). Regarding the respective correlation between the representative color and the region information, like the above case of 2 colors, the color data at the coordinates (0, 0), (0, 1), (0, 2), . . . , (3, 3) of the corresponding picture elements are respective color data C00, C00, C01, . . . , C11 indicated by the pointer P00, P00, P01, . . . , P11. Finally, when the third dividing prepares the 8 representative colors, after adding eight of the representative-color data and the subordinate 1 bit of the region information, the encoded data 508 is configured as shown in FIG. 11(b3). The respective correlation between the representative color and the region information is the same, of which the explanation is omitted.

In the encoded data, first the representative color data Cn is correlated with the region information respectively, and then the position of the each region information Aij is corresponding to the address of the picture element of the small region. Therefore, the extracting of the region information does not need a special method, and it is possible to execute the decoding at very high speed.

Generally, when the color data is processed as the multivalued image data, the data volume is very huge. In case of the image data of A4 size at 600 dpi, the data capacity is required to have 96 MB and more. Therefore, it is impossible for a popular personal computer to store this image data in the working memory temporarily. Contrarily, it is easy for the encoded data to which the invention is applied to be stored in the working memory temporarily because the volume can be compressed to ¼ to ⅐ of the image data. Therefore, as the processing of the image data can be performed without using the hard disk or the like, it is possible to carry out the image processing at high speed.

Though the data compressing of the invention is irreversible, the processing volume for the decoding is very small comparing with that of JPEG that is also the irreversible compressing. By using the encoded data as an intermediate file, it is expected that the processing for various images can be performed at high speed. It is needless to say that, in case of storing the encoded data in a hard disk and applying them to various usages, the decoding circuit 66 can adjust the output number of colors according to the number of colors requested by a user or the performance of the device processing the encoded data.

Here is explained about the method of the simplified displaying of the color image using the encoded data.

Among the 8 colors, C000, C001, C010, C011, C100, C101, C110, and C111, the 4 colors of C000, C001, C010, and C011, wherein the upper 1 bit of the region information have "0" in common, are the representative colors obtained by dividing by 2 times the sections of representative color C0 and the region information Aij=0 extracted at the first dividing. Accordingly, taking the above dividing process into consideration, in order to simplify and display the small region expressed by the encoded data 508 with two colors, it is reasonable to calculate the data of 2 colors as follows by giving attention to the upper 1 bit of the region information.

That is to say, when two colors of the simplified displaying data should be represented by C2a and C2b, by using the encoded data, C000 to C111, the following equations calculate the approximation data:

$$C2a = (C000 + C001 + C010 + C011) \div 4$$

$$C2b = (C100 + C101 + C110 + C111) \div 4$$

Corresponding C2a and C2b to the value "0" or "1" of the region information Aij (504a), each displaying color Cij is determined as Cij=C2a when Aij=1, or Cij=2Cb when Aij=0.

Besides, in case of the simplified displaying with 4 colors, the data for the 4 colors may be calculated by giving attention to the upper 2 bits of the region information likewise. In other words, the simplified displaying data should be represented by C4a, C4b, C4c, and C4d, by using the encoded data, C000 to C111, the following equations calculate the approximation data:

$$C4a = (C000 + C001) \div 2$$

$$C4b = (C010 + C011) \div 2$$

$$C4c = (C100 + C101) \div 2$$

$$C4d = (C110 + C111) \div 2$$

In addition, in case of the reducing of the image, after extracting the region information Aij corresponding to sampling picture elements and representative color Cij corresponding to the region information from the encoded data as shown in FIG. 12, the reduced image can be prepared by calculating the approximation data like the above. As prescribed before, since the encoded data 508 is a fixed data size, the required color data can be calculated immediately.

As explained above, the invention extracts the representative colors by performing the dividing in the order from the target color having the large variance, so that the invention may have effectiveness that it is possible to perform the extracting of the representative colors at high speed and with high precision. At this time, after determining the required number of colors according to the color-number of the image in the object region, the dividing is performed. Therefore, it is possible to materialize the extracting of the representative colors with high precision at high speed along with suppressing the unnecessary processing.

Besides, the region information is classified as layer; thereby the data transmission can be carried out with increasing the number of colors sequentially. Moreover, the layered region information is correlated with the representative color; thereby the data processing to display the image by required number of colors can be performed by a simple way.

What is claimed is:

1. An image processing method extracting a specific number of representative colors from colors of a small region on a color image, the image processing method comprising the steps of:
    calculating variances of the small region in color for respective color components;
    selecting one color component with the largest variance among the color components as a target component;
    dividing the small region into two sections by preparing region information indicating a section to which each of picture elements within the small region belongs, according to whether data in the target component of each picture element is more than an average of data in the target component of the small region or not; and
    extracting a representative color for each section from colors of the section according to the region information and data in the respective color components of picture elements in the section.

2. An image processing method according to claim 1, further comprising the step of setting each section as a small region if the number of the sections is less than the specific number.

3. An image processing method according to claim 1, further comprising the steps of:
    computing color differences among data included in the small region; and
    determining the specific number according to the color differences.

4. An image processing method according to claim 1, further comprising the steps of:
    extracting the number of colors included in the small region;
    comparing the extracted number of colors and the specific number; and
    setting the extracted number of colors as the specific number when the extracted number of colors is less than the specific number.

5. An image processing method according to claim 1, further comprising the steps of:
    preparing region color data, which is a pair of the data of the representative colors and region information indicating sections of which the representative colors are extracted from colors; and
    increasing the number of representative colors sequentially.

6. An image processing method according to claim 5, further comprising the step of preparing a displayed image for a user from the region color data by selecting the number of the representative colors.

7. An image processing method according to claim 5, further comprising the step of transmitting the region color data by increasing the number of the representative colors sequentially.

8. An image processing method according to claim 5, further comprising the steps of:
    receiving the region color data by increasing the number of the representative colors sequentially; and
    displaying the color image for a user by increasing the number of the representative colors sequentially per the receiving.

9. An image processing method according to claim 5, further comprising the steps of:
    setting the number of colors required for displaying an image for a user;
    extracting plural representative colors from the region color data according to the required number of colors; and
    deriving the color data of the displayed image according to the plural representative colors.

10. An image processing method according to claim 1, further comprising the step of:
    switching a mode between a color mode and a monochrome mode, and wherein when the mode is switched to the monochrome mode, a specified color data is selected instead of the target component and the small region is divided into two sections according to a reference value of the selected color data instead of the target component.

11. An image processing method according to claim 10, wherein the reference value is an average.

12. An image processing apparatus extracting a specific number of representative colors from colors of a small region on a color image, the image processing method comprising:

statistic calculating means for calculating variances of the small region in color for respective color components;

dividing means for selecting one color component with the largest variance among the color components as a target component and dividing the small region into two sections by preparing region information indicating a section to which each of picture elements within the small region belongs, according to whether data in the target component of each picture element is more than an average of data in the target component of the small region or not; and representative-color extracting means for extracting a respective color for each section from colors of the section according to the region information and data in the respective color components of picture elements in the section.

13. An image processing apparatus according to claim 12, further comprising setting means for setting each section as a small region when the number of the sections is less than the specific number.

14. An image processing apparatus according to claim 12, further comprising:

color-difference detecting means for computing color differences among data included in the small region; and number-of-representative-color determining means for determining the specific number according to the color differences.

15. An image processing apparatus according to claim 12, further comprising:

number-of-color extracting means for extracting the number of colors included in the small region; and number-of-representative-color setting means for, when the extracted number of colors is smaller than the specific number by comparing the number of colors, setting the extracted number of colors as the specific number.

16. An image processing apparatus according to claim 12 further comprising:

region-color-data preparing means for preparing a region color data combining color data of the representative colors and region information indicating sections of which the representative colors are extracted from colors, by increasing the number of representative colors sequentially.

17. An image processing apparatus according to claim 16, further comprising displayed image preparing means for preparing a displayed image for a user from the region color data by selecting the number of the representative colors.

18. An image processing apparatus according to claim 16, further comprising transmitting means for transmitting the region color data by increasing the number of the representative colors sequentially.

19. An image processing apparatus according to claim 16, further comprising:

receiving means for receiving the region color data by increasing the number of the representative colors sequentially; and displaying means for displaying the color image for a user by increasing the number of the representative colors sequentially at the time of the receiving.

20. An image processing apparatus according to claim 16, further comprising:

number-of-color setting means for setting the number of colors required for displaying an image for a user;

representative-color extracting means for extracting plural representative colors from the region color data according to the required number of colors; and displayed-color deriving means for deriving the color data of the displayed image by combining the plural representative colors.

21. An image processing apparatus according to claim 12, further comprising:

mode switching means for switching a mode between a color mode and a monochrome mode, and wherein when the mode is switched to the monochrome mode, a specified color data is selected instead of the target component and said dividing means divides the small region into two sections according to a reference value of the selected color data instead of the target component.

22. An image processing apparatus according to claim 21, wherein the reference value is an average.

23. An image processing apparatus provided with a transmitting device transmitting data of a color image divided into plural small regions, and a receiving device receiving the transmitted data and restoring and displaying the color image corresponding to the data, wherein the transmitting device comprising:

statistic calculating means for calculating variances of the small region in color for respective color components;

dividing means for selecting one color component with the largest variance among the color components as a target component and dividing the small region into two sections by preparing region information indicating a section to which each of picture elements within the small region belongs, according to whether data in the target component of each picture element is more than an average of data in the target component of the small region or not; and representative-color extracting means for extracting a respective color for each section from colors of the section according to the region information and data in the respective color components of picture elements in the section;

region-color-data preparing means for preparing a region color data combining color data of the representative colors and region information indicating sections of which the representative colors are extracted from colors; and, transmitting means for transmitting the region color data, and, the receiving device comprising:

receiving means for receiving the region color data by increasing the number of the representative colors sequentially; and displaying means for displaying the color image for a user by increasing the number of the representative colors sequentially at the time of the receiving.

* * * * *